(No Model.)
G. M. STRONG.
METHOD OF UNITING EYES TO HAME IRONS.
No. 358,501. Patented Mar. 1, 1887.
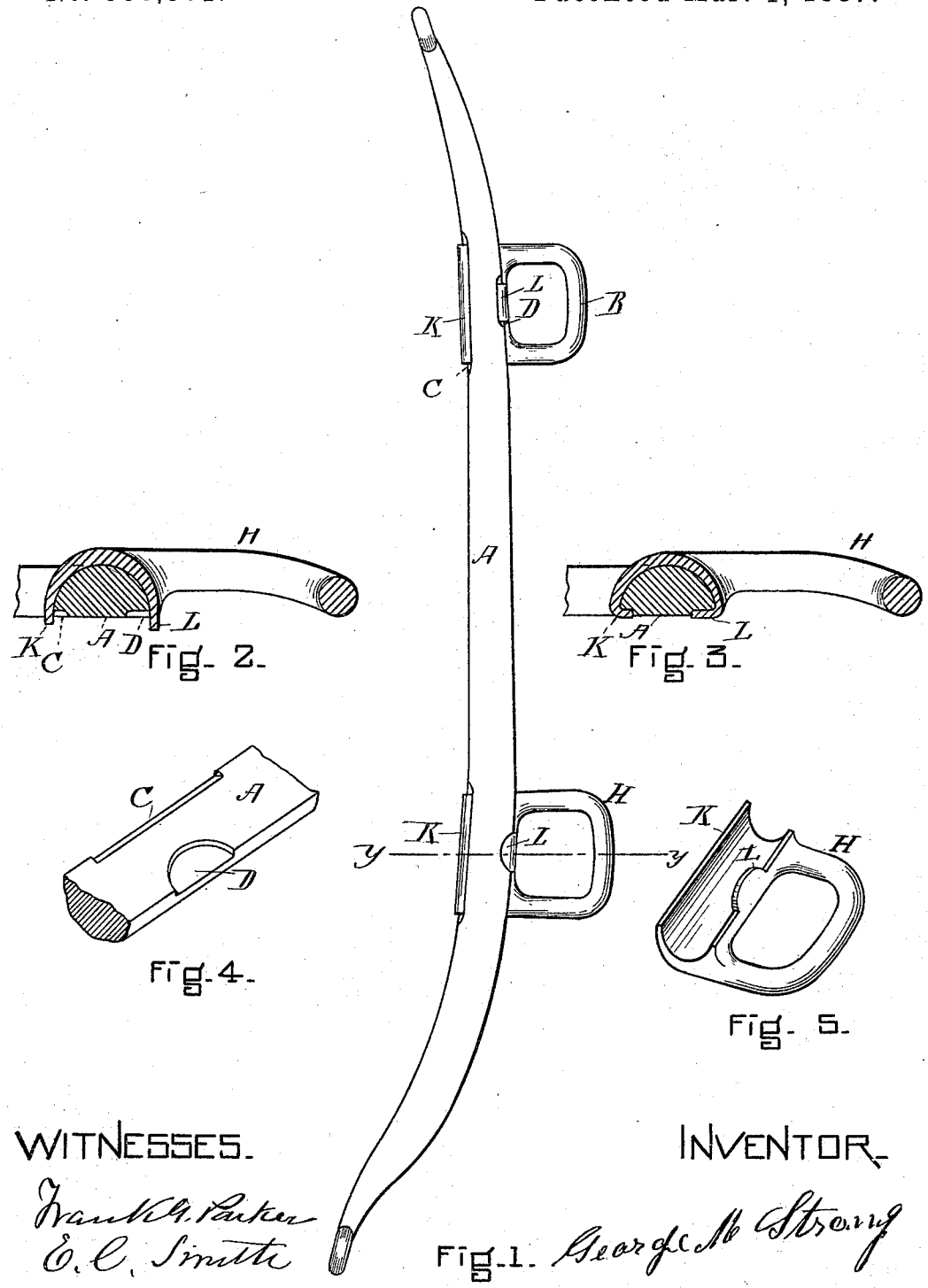
WITNESSES.
Frank G. Parker
E. C. Smith
INVENTOR.
George M. Strong

UNITED STATES PATENT OFFICE.

GEORGE M. STRONG, OF BOSTON, MASSACHUSETTS.

METHOD OF UNITING EYES TO HAME-IRONS.

SPECIFICATION forming part of Letters Patent No. 358,501, dated March 1, 1887.

Application filed June 14, 1886. Serial No. 205,153. (No model.)

*To all whom it may concern:*

Be it known that I, GEORGE M. STRONG, of Boston, in the county of Suffolk and State of Massachusetts, have invented a new and useful Improvement in the Method of Uniting Eyes to Hame-Irons, of which the following, taken in connection with the accompanying drawings, is a specification.

My invention relates to the union of terret and draft eyes to hames, the object being to provide a strong and cheap method of uniting these eye-pieces, which are usually made of composition, to the iron part of the hames, and to avoid the use of rivets or screws. These objects I accomplish by the mechanism shown in the accompanying drawings, in which—

Figure 1 is an elevation showing one of the hame-irons with a terret-eye and draft-eye attached. Fig. 2 is a section taken on line Y Y of Fig. 1, the parts L and K being represented as unbent. Fig. 3 is a section taken on the line Y Y of Fig. 1, in which the parts L and K are represented as bent down onto the hame-iron A. Fig. 4 is an enlarged view of that part of the hame-iron to which the draft-eye is attached, and Fig. 5 is a perspective view of a draft-eye unattached.

In the drawings, A represents the hame-iron, which is made in the usual manner, except that at the places to which the eyes are attached recesses C and D are formed, as shown plainly in Figs. 2 and 4. The eyes B and H are made substantially alike, and each is provided with overlying lips K and L.

My method of uniting the eyes to the hame-iron is this: First, both of the parts which are to be brought in contact are carefully cleansed, then covered with solder, and the parts pressed firmly together and brought to a temperature sufficient to melt the solder, or, in other words, to sweat the parts together. The next step is to press down the overlying lips L and K, so that the thing produced would appear like the section shown at Fig. 3. This pressing down of the overlying lips may take place while the parts are still hot, so that a soldered union may take place between them.

I claim—

The method of uniting eyes to hame-irons by the following steps: first, forming in the hame-iron recesses D and C; second, bending down the overlying lips L and K; third, sweating the parts together, substantially as described, and for the purpose set forth.

GEORGE M. STRONG.

Witnesses:
 FRANK G. PARKER,
 E. C. SMITH.